United States Patent [19]

Klaassen

[11] 4,098,974
[45] Jul. 4, 1978

[54] POLYALKENES OF WIDE MOLECULAR WEIGHT DISTRIBUTION

[75] Inventor: Dirk Klaassen, Geleen, Netherlands

[73] Assignee: Stamicarbon, B.V., Geleen, Netherlands

[21] Appl. No.: 709,081

[22] Filed: Jul. 27, 1976

[30] Foreign Application Priority Data

Aug. 5, 1975 [NL] Netherlands .................. 7509292

[51] Int. Cl.$^2$ .................... C08F 2/14; C08F 2/38; C08F 10/00; C08F 10/02
[52] U.S. Cl. .................................. 526/65; 526/64; 526/73; 526/88; 526/352
[58] Field of Search .................. 526/64, 65, 73, 88

[56] References Cited

U.S. PATENT DOCUMENTS

| 3,380,978 | 4/1968 | Ryan et al. | 526/64 |
| 3,875,128 | 4/1975 | Suzuki et al. | 526/65 |
| 3,988,395 | 10/1976 | Myerholtz | 526/73 |

FOREIGN PATENT DOCUMENTS 715,666  9/1954  United Kingdom ............... 526/68

Primary Examiner—Alan Holler
Attorney, Agent, or Firm—Cushman, Darby & Cushman

[57] ABSTRACT

A two-stage cyclical process for producing alkene polymers of wide molecular weight distribution, in which high molecular weight polyalkenes are produced in one stage and lower molecular weight polyalkenes are produced in the other stage and in which polyalkene from one of said stages is introduced into the other of said stages.

10 Claims, 1 Drawing Figure

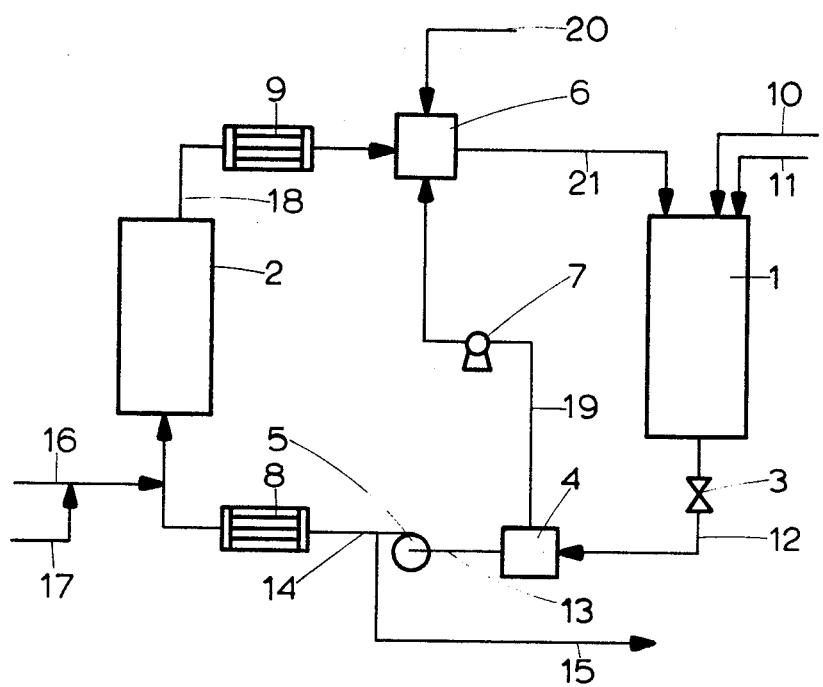

POLYALKENES OF WIDE MOLECULAR WEIGHT DISTRIBUTION

BACKGROUND OF THE INVENTION

The invention relates to the production of polyalkenes of wide molecular weight distribution.

The invention is directed to a process for polymerizing α-alkenes of 2 to 8 carbon atoms, and in particular to the polymerization of ethylene and propylene. The polymerization process of the invention contemplates the polymerization of α-alkenes, optionally with minor amounts of at least one other α-alkene of 2 to 10 carbon atoms.

The polymerization is undertaken in the presence of a catalyst comprising at least one compound of a transition metal selected from the group consisting of Groups 4 to 6 or 8 of the Periodic Table. Practically, an organometallic compound of a metal from Groups 1 to 3 of the Periodic Table is admixed with the compound of the transition metal. The catalyst may be of the type described in U.S. Pat. Nos. 3,257,332; 3,377,332 and 3,574,138, all of which are hereby incorporated by reference herein. However, the exact nature of the catalyst composition used to undertake the polymerization of the invention is not critical.

The polymerization process may be undertaken at pressures of up to 100 kg/cm$^2$ in a liquid solvent to produce a polymer with ASTM D-1238 melt index of below 100 and with a wide molecular weight distribution. These results of the process are realized by undertaking the polymerization in at least two reactors which employ similar catalyst systems and under polymerization conditions in one of the reactors which effects the formation of alkene polymer of high molecular weight, compared to the molecular weight of the polymer produced in the other one of said at least two reactors. Concomitantly, the polymerization conditions in said other reactor effects the formation of a polymer with a low molecular weight compared to that polymer of high molecular weight.

Polyalkenes of wide molecular weight distribution are particularly desirable for applications of polyalkenes, and in particular in applications of polyethylene, such as, e.g., extruding bottles, cables, tubes and the like, and in blow-molding. Polyethylenes, characterized by wide molecular weight distribution, when used in the aforementioned processes, can be used to produce articles of better surface gloss, while surface defects, including melt fracture are substantially obviated. Thus, in processing polyethylenes of similar melt indices, that polyethylene with the widest molecular-weight distribution will yield articles with best surface gloss, with fewer surface defects, such as that described above.

Low molecular weight, i.e. and high melt index, polyalkenes are characterized by comparatively high flow rates in extrusion processes, with relatively infrequent occurrence of melt fracture. However, low molecular weight polyalkenes produce articles of mechanical structure characterized by relatively poor tensile strength, toughness, and stresscrack resistance, compared to high molecular weight polyalkenes.

Polyalkenes of high molecular weight, particularly high molecular weight polyethylene and polypropylene, are preferred for use in the manufacture of articles by extrusion or blow-molding. The use of polyalkenes of relatively high molecular weight and wide molecular-weight distribution obviates the problems of poor flow, lack of surface gloss and surface defects. The desirable molecular-weight distributions and molecular-weight values are elucidated in Modern Plastics, Pages 109-112 (December 1957) and in Technical Papers, Volume 7 of the 17th Annual Technical Conference of the Society of Plastics Engineers 28-1, Pages 1-4, which are incorporated herein by reference.

Many processes for the preparation of polyalkenes, in particular polyethylene, of wide molecular weight distribution have been described.

Belgian patent specification No. 551,931 suggests mixing polyethylene of high molecular weight with polyethylene of low molecular weight to obtain polyethylene which is characterized by the desired properties. British patent specification No. 1,233,599 proposes a similar process. The disadvantages of the products produced by such mechanical mixtures is that the products are characterized by a lack of homogeneity which is especially manifest and unacceptable in the manufacture of thin-walled articles, such as films, bottles, and the like.

Further attempts to produce high molecular weight polyalkenes of wide molecular weight distribution have been disclosed to reside in the selection of particular catalyst systems. Processes for preparing high molecular weight polyalkenes of wide molecular weight distribution, by virtue of the particular catalyst system employed in the polymerization, are disclosed in British patent specification Nos. 1,154,884; 1,114,020; 1,170,299 and U.S. Pat. No. 3,509,117.

The aforementioned processes, which rely upon the nature of the catalyst system to produce polyalkenes of high molecular weight and wide molecular weight distribution are characterized by the disadvantages of slow polymerization rates. Slow polymerization rates produce low yields of polymer, relative to the catalyst residue and thus result in polymers which contain high amounts of catalyst residue contamination, which must be removed by washing. Large amounts of catalyst are necessary in these processes. In addition, the step of washing the resulting polymer free of catalysts render these processes uneconomical. Although the British patent specification No. 1,170,299 asserts that the process disclosed therein results in much higher yields which obviates the necessity of the washing step to free the polymer of catalysts, according to Example 1 of that reference, polymerization for seven hours in an absolute pressure of 5 atmospheres produces a polymer that contains 195 ppm of titanium. The titanium content of that product far exceeds the present requirements that the titanium content is less than 30 parts per million. Thus, because of the present requirements concerning titanium content in polyalkene polymers, the process according to British patent specification No. 1,170,299 would necessitate the step of washing polyalkene to free the polyalkene of catalyst residues. Additional processes have been disclosed in the prior art for producing α-alkenes of wide molecular weight distribution. It has been proposed to carry out α-alkene polymerizations in two or more stages to produce polyalkenes, particularly polyethylenes, of different molecular weights in the different stages and, hence, to produce a final product with a wide molecular weight distribution. Such processes are disclosed, for instance, in U.S. Pat. No. 3,074,922; German Auslegeschrift No. 1,138,940; French patent specification No. 1,236,365; and in U.S. Pat. Nos. 3,392,213 and 3,592,880.

According to the above U.S. Pat. No. 3,592,880 ethylene is polymerized in two stages: In one stage 5 to 30% by weight of the total amount of polymer is produced, while 70 to 95% by weight of the total amount of the polymer is produced in the second stage. In that stage in which 5 to 30% by weight of the total polymer is produced, 0 to 10% by volume of the gaseous phase is hydrogen, while in that second stage in which 70 to 95% by weight of the total polymer is produced, the hydrogen content is 20 to 80% by volume of the gaseous phase.

Luxemburg patent specification No. 43,556 discloses a process for polymerizing propylene to polypropylene characterized by a wide molecular weight distribution by controlling the amount of hydrogen used in the course of the polymerization, i.e. by varying the amounts of hydrogen used during the polymerization.

Although the prior art shows producing polyalkenes, particularly polyethylene, with wide molecular weight distribution by employing multistage polymerization processes, the resulting materials of these processes, when molded into articles and especially when blow-molded into bottles and into sheets of films, are characterized as containing non-homogeneities, which are attributed to gel formation within the polymer. Such non-homogeneities are manifested as small granular irregularities in the molded articles.

The cause of these irregularities has not been determined satisfactorily. It is assumed that the extreme values of the molecular weight of the polymers from the various reaction stages differ widely and that, in view of the molecular weight distribution of the polymer formed in each stage, slight amounts of material with very high molecular weight are formed which cannot, or with great difficulty can, be mixed homogeneously with the other polyalkene. However, this assumption has not been proved and is not to be considered a binding rationalization for the resulting in homogeneities in the aforementioned prior art polyalkenes.

SUMMARY OF THE INVENTION

It has now been found that polyalkenes with a wide molecular weight distribution and a very good homogeneity can be obtained by polymerizing an $\alpha$-alkene of 2 to 8 carbon atoms, especially ethylene or propylene, optionally with of at most 10 mole % of at least one other $\alpha$-alkene of 2 to 10 carbon atoms, in two reactors in cycle: (a) while monomer(s), catalyst and distributing agent (solvent) are fed to one reactor and (b) polymer suspension is drained from this reactor and fed to the second reactor to which, optionally, may be fed monomer and distributing agent. Polymer suspension is drained from the latter reactor and fed again to the former reactor, and part of the recycling polymer suspension is drawn off from the cycle through a drain in the system. The polymerization conditions in one of the reactors are chosen to produce a polymer of comparatively low molecular weight; and the polymerization conditions in the other reactor are so chosen that a polymer is formed in it which has higher molecular weight than that of the polymer produced in the first-mentioned reactor. The polymer which is drained from the system can be processed by conventional techniques.

DETAILED DESCRIPTION OF INVENTION

In polymerizing $\alpha$-olefins in the presence of catalysts containing transition-metal compounds, the molecular weight can be controlled, i.e., by the choice of the temperature. At low polymerization temperatures polymers (of $\alpha$-olefins) of high molecular weight are produced; and conversely at relatively higher polymerization temperatures, polymers (of $\alpha$-olefins) of relatively low molecular weight are produced. The molecular weight can also be controlled by the addition of molecular-weight controllers, among which hydrogen is the most conventional. If, in the aforementioned two reactors in cycle, polymer of different molecular weight is to be prepared by employing a molecular-weight controller (regulator), a different monomer pressure may be used in each of the reactors, so that the ratio of monomer to molecular-weight controller (which determines the molecular weight) is different in the reactors.

Preferably, however, polymer of different molecular weight is formed in the two reactors by adding a molecular weight controller to one of the reactors so that a polymer with a comparatively low molecular weight is formed, and by removing the molecular-weight controller completely or to a considerable extent from the polymer suspension, discharged from the first reactor and introduced to the other (second) reactor then a polymer (which is substantially free of molecular-weight controller) is formed in this second reactor in the cycle which is characterized by relatively high molecular weight. The molecular-weight regulator, optionally together with monomer and solvent which along with the molecular-weight regulator may have been drained from the system in the polymer suspension, may then be passed into that part of the system which feeds the reactor in which polymer of comparatively low molecular weight is formed and incorporated into the reaction mixture flowing to that reactor.

If necessary, additional molecular-weight controller can be added to the feed of the reactor in which polymer of comparatively low molecular weight is formed or may be introduced to the reactor itself.

If necessary, the last-mentioned embodiment may be used, e.g., in combination with different temperatures and/or pressures in the two reactors.

The process according to the invention may be used for the polymerization of alkenes of 2–8 carbon atoms, (wherein if said alkene is the alkene of 3–8 carbon atoms, it is an $\alpha$-alkene) such as ethylene, propylene, butene-1, pentene-1, hexene-1 or 4-methyl pentene-1, and, in particular, for the polymerization of ethylene or propylene. If so desired, another $\alpha$-alkene of 3–10 carbon atoms may be used as a comonomer in an amount of at most 10 mole % based on the main monomer.

The monomer may be added to one of the reactors in the cycle or to both reactors.

Of the useful catalysts described generally below, those obtained by activating the reaction product of (1) a tetravalent titanium compound, optionally in the presence of another transition-metal compound, and (2) an organometal compound with an organo-aluminum compound are very suitable. Catalysts of this type have been described, e.g., in British patent specification No. 1,373,981, which is incorporated herein by reference. Naturally the invention is not restricted to polymerizations with catalysts described in the aforementioned reference. The amount of catalyst to be used generally corresponds to 0.001 to 10 moles, preferably 0.01 to 1 mmole, and, more in particular, 0.01 to 0.05 mmole of transition metal per liter of solvent. The catalyst may be fed to the cycle in one or several places, preferably suspended or dissolved in the distributing agent. Thus, the catalyst may be fed to that reactor to which the molecular-weight controller is fed.

The distributing agent (or solvent) may be any liquid that is inert to the catalyst system and the other compounds present in the cycle. Examples are saturated aliphatic (straight or branched chain) hydrocarbons of 4–12 carbon atoms, such as butane, isobutane, pentane, hexane, heptane, pentamethyl heptane or petroleum fractions, such as light naphtha, gasoline, kerosine, gas oil, aromatic hydrocarbons, such as benzene or toluene, and halogenated aliphatic or aromatic hydrocarbons, such as tetrachlorethane. The distributing agent may be fed to the cycle in one or several places, either in the pure state or mixed with other components, such as catalyst and/or monomer. In the polymerization of α-alkenes with 3 or more carbon atoms, it is also possible to use the monomer as the distributing agent.

The molecular-weight controller to be used may be any compound that, in combination with the catalyst system used and the monomer or mixture of monomers to be polymerized, gives rise to the formation of a polymer with a lower molecular weight and which can be removed from the reaction mixture or rendered inactive otherwise in a comparatively simple way. The easiest way of removing all or part of the molecular-weight controller from the flow of polymer suspension is evaporation. To this end a relief valve may be installed in the discharge of the reactor in which polymer with a comparatively low molecular weight is formed. The decrease in pressure over it will cause part of the distributing agent and monomer to change into the vapor phase. A volatile molecular-weight controller will then partly or complete vaporize. The molecular-weight controller used most of all, hydrogen, is particularly suitable for this purpose.

It can be removed from the cycle very easily by lowering the pressure in the system to a value at which the hydrogen escapes completely or largely as a gas generally together with part of the distributing agent and the monomer. In those cases in which the polymerization is effected under pressure, relief of the pressure to at least atmospheric suffices. Although it is possible in principle to reduce the pressure to below atmospheric pressure, it is generally not recommendable because the compressive energy to raise the pressure in the system will then be unnecessarily great. The hydrogen and any other components released as a gas are separated from the liquid phase in a known way. Subsequently, the gas is raised to the polymerization pressure, or, if so desired, a slightly higher pressure, and then returned, by way of an absorber, to that part of the system feeding the reactor where the polymer with a lowered molecular weight is obtained. Sufficient additional hydrogen is fed to this part of the system to keep the hydrogen level at a given value. The amount of hydrogen present in this part of the system (in which low molecular weight polyalkenes are produced) depends on the sensitivity of the system to the action of hydrogen. For instance, in a rather sensitive system, hydrogen can be added to achieve a hydrogen: monomer molar ratio, (especially where the monomer is ethylene or propylene) in the gaseous phase that is in equilibrium with the liquid phase is about 75:25 to 85:15 at about 85° C.

In the part of the system in which high molecular weight polyalkene is produced, polymerization can be effected without or with comparatively little hydrogen. In the above-mentioned system the molar ratio of hydrogen to monomer in the gaseous phase may vary, e.g., from negligible amounts of hydrogen or no hydrogen to 10:90 (from about 0 to 10:90) and even 25:75.

Since it is a recycle system in which the polymer particles contained in the suspension consist of both polymer of relatively low molecular weight and polymer of relatively higher molecular weight, it is not possible to state exactly what the molecular weight and the other properties of the polymer formed in each reactor are. What can be stated is that the reaction conditions are chosen so that if polymerization is only undertaken, for instance, in the part of the system in which relatively low molecular weight polyalkene is produced—in the case of ethylene polymerization, for instance — a polyethylene with a melt index of at most 100, more in particular between 40 and 80, would be obtained.

Likewise, if polymerization were undertaken only in the part of the system in which high molecular weight polymers were produced, then in the case of ethylene polymerization, a polyethylene with a melt index of less than 1, e.g., between 0.005 and 0.05 would be generally obtained.

Thus part of the recycling polymerization mixture which is drawn off from the system can then be processed further to recover the polymer. In general, $\frac{1}{4}$ to 1/15, and preferably 1/7 to 1/12, part of the polymerization mixture may be drawn off. In the cyclic system polymer suspension may be withdrawn from that part of the system in which high molecular weight polyalkene is produced and more in particular at a point after the removal of the molecular-weight controller, if such removal is effected.

In addition to the above-mentioned components, other compounds normally used in the polymerization of alkenes, such as, e.g., activators, may be fed to the system.

The process according to the invention yields polymers of wide molecular weight distribution and a melt index of below 100. In the polymerization of ethylene, the melt index of the resulting product generally ranges between 0.1 and 0.5 for extrusion and blow-molding grades. Another important characteristic with respect to the processability is the flow index, which is defined as $MI_{30}/(m.i.)^{3/4}$; m.i. is the melt index measured according to ASTM D-1238 at a load of 2.16 kg.; $MI_{30}$ denotes a similar parameter, which is likewise measured according to ASTM D-1238, but at a load of 30 kg. The flow index of polyethylene prepared according to the invention in extrusion and blow-molding grades ranges from 10 to 20, more in particular 12 to 16.

The polymer obtained by the process according to the invention can be processed into thin-walled articles and films with a very low gel content.

The process according to the invention may be carried out at pressures of between 1 and 100 kg/cm², more in particular between 6 and 80 kg/cm², and preferably between 12 and 50 kg/cm². If the molecular weight controller is removed by lowering the pressure, it is evident that a low-pressure zone is present in the system. The pressure of the liquid phase from this zone, which is completely or largely free of molecular weight controller, is then raised again to the desired polymerization pressure. The temperature at which the polymerization, or rather polymerizations are carried out generally ranges between 10° and 110° C, preferably between 50° and 100° C and, more in particular between 70° and 90° C. The polymerization heat released can be removed by cooling the reactor and/or other parts of the recycle system or, if so desired, by evaporation and condensation of part of the distributing agent and/or the monomer.

The invention will be explained, as an example, with reference to the figure by describing an embodiment of the process in which removal of hydrogen is effected by lowering the pressure and feed-back by absorption at a higher pressure.

The nature of the apparatus used in the process is disclosed in our copending application, Ser. No. 709,080 filed on July 27, 1976, and entitled: "Apparatus for producing polymers having a wide molecular weight distribution".

A stirred reactor 1 that is filled virtually completely with liquid is fed, through conduit 10, with ethylene which has been dissolved in the distributing agent and, through conduit 11, with catalyst which has also been dissolved in the distributing agent. The reaction mixture is drawn off through conduit 12, in which a relief valve 3 is fitted. The gas-liquid mixture obtained at the decrease in pressure is separated in separator 4. The liquid phase, which consists of a polymer suspension, is passed through conduit 13 to pump 5, which raises the pressure of the liquid phase to the polymerization pressure, and is then passed to reactor 2 through conduit 14, in which a cooler 18 is fitted. Reactor 2 is of the same type as reactor 1. Part of the polymer suspension is continuously drawn off through conduit 15 and passed to a processing section (not shown) where the catalyst is deactivated and the polymer is recovered. The solvent recovered in the processing section, after being mixed with ethylene supplied through conduit 17, is fed to reactor 2 through conduit 16. From reactor 2, the reaction mixture is passed to an absorber 6 through conduit 18, in which a cooler 9 is fitted. This absorber is also fed, through conduit 19, with the mixture of hydrogen, distributing agent and ethylene that has been separated as a gas in separator 4 and has been raised to the polymerization pressure by compressor 7. If so required, additional hydrogen is fed in through conduit 20. From the absorber the reaction mixture is returned to reactor 1. Consequently, in the recycle system described, polyethylene with a low molecular weight is formed in reactor 1 and polyethylene with a high molecular weight is formed in reactor 2. Both reactors may be equally large, but it is also possible to use reactors of different sizes. Naturally, reactor 1 and/or reactor 2 may also be replaced by two or more smaller reactors connected in parallel or in series.

The pressure and the temperature in the two reactors need not be equal, although such will be the case in many instances for practical reasons. Furthermore, a small amount of comonomer may be added to one ethylene feed and not to the other.

EXAMPLE

Ethylene was polymerized in a device of the type shown diagrammatically in the FIGURE. The ethylene was mixed with 1.5 mole % of butene as a comonomer. The distributing agent used was low boiling gasoline with a boiling range of 60° to 80° C. The polymerization temperature was 50° C in reactor 2 and 85° C in reactor 1; the operating pressure was 20 atm absolute. The pressure was lowered to 5 atm. absolute across relief valve 3. The molecular-weight controller was hydrogen.

2.72 kg/h of ethylene and 3.34 kg/h of low boiling gasoline were fed to the system through conduits 16 and 17. The hydrogen to be supplied, if so required, through conduit 20 was so controlled that, after absorber 6, the hydrogen: ethylene weight ratio in the liquid phase in reactor 1 amounted to 1:35, an ethylene feed through conduit 11 of 2.28 kg/h being taken into account.

Catalyst prepared in the following manner was added through conduit 10.

In an atmosphere of pure nitrogen, 264 ml of a 2-molar solution of monoethyl aluminum dichloride (MEAC) in low-boiling gasoline (boiling range 62°–82° C) are put in a reactor provided with a stirrer and a feed. At 40° C, 440 ml of a 0.3-molar solution of dibutyl magnesium (DBM) in low-boiling gasoline are added slowly with stirring. After the addition of the dibutyl magnesium has been completed, stirring is continued for 20 more minutes at 40° C. Next, 25 ml of a 4-molar solution of $TiCl_4$ in low-boiling gasoline are added dropwise, and finally 271 ml of low-boiling gasoline are added to make up the total volume of 1 liter. The temperature is constantly kept at 40° C and, after the addition of the $TiCl_4$ has been completed, stirring is continued for another 45 minutes at 40° C. The suspension thus obtained contains 528 mmoles/1 of MEAC; 132 mmoles/1 of DBM; 100 mmoles/1 of $TiCl_4$, or reaction products thereof.

The catalyst feed was so adjusted that 86 mg (1.79 mmoles) of titanium, in the form of titanium compounds, were added per hour. As a result of the pressure decrease across relief valve 3 and the discharge of hydrogen, ethylene and distributing-agent vapor through conduit 19, a hydrogen/ethylene weight ratio in the liquid phase of 1:436 was adjusted in reactor 2. Polymer suspension consisting of 5 kg/h of polyethylene and 6.13 kg/h of low-boiling gasoline was discharged through 15. The suspension was processed by deactivating the catalyst by addition of 0.18 l/h of butanol, and then separating the polyethylene from the gasoline and drying it.

The polyethylene, which contained only 10 p.p.m. of Ti and, hence, did not need to be freed of catalyst residues, had a melt index (m.i.) of 0.19 and a flow index, as defined above, of 16.5. If polyethylene with a melt index of 0.19 is prepared in one reactor at the same polymerization temperature by means of the same catalyst system, the flow index is only 4.7 when the polymerization is effected at 85° C and 6.4 when the polymerization is carried out at 60° C.

What is claimed is:

1. A continuous multi-stage process for the suspension polymerization of at least one α-alkene of from 2 to 8 carbon atoms,
   in the presence of a catalyst comprising at least one compound of at least one transition metal selected from the class consisting of the metals of Groups 4, 5, 6 and 8 of the Periodic Table, and,
   in the presence of a molecular weight controller, and under pressures of at most 100 kg per $cm^2$, and
   in an inert liquid solvent,
   which comprises conducting the suspension polymerization reaction in a system of at least two reaction stages, (a) and (b), wherein each such stage employs the same catalyst system,
   while maintaining the molar ratio of said molecular weight controller to said α-alkene in stage (a) at a level higher than in stage (b), whereby there is formed in stage (a) a polyalkene having a lower average molecular weight than that of the polyalkene formed in stage (b), while also continuously passing polymer suspension formed in reaction stage (a) into reaction stage (b), and while continuously passing polymer suspension formed in stage (b) into stage (a), whereby there is continuously produced a polyalkene having a wide molecular-weight distribution and an ASTM D-1238 melt index of below 100.

2. Process according to claim 1, wherein said molecular weight-controller is hydrogen.

3. Process according to claim 1, wherein the molar ratio of hydrogen to alkene in the gaseous phase is between about 75:25 and about 85:15 in stage (a) and said ratio in stage (b) is less than about 25:75.

4. Process according to claim 3 wherein said alkene is ethylene.

5. Process according to claim 4 wherein the molar ratio of hydrogen to ethylene in the gaseous phase in stage (b) is between about 10:90 and about 25:75.

6. The process according to claim 1, wherein a portion of the molecular weight controller is removed from the polymer suspension passing from stage (a) to stage (b) thereby reducing the molar ratio of molecular weight controller to α-alkene to a lower level than the molar ratio of molecular weight controller to α-alkene in stage (a).

7. Process according to claim 1, wherein the polymerization is carried out at a temperature of 10°–110° C.

8. Process according to claim 7, wherein the polymerization is carried out at a temperature of 50°–100° C.

9. Process according to claim 1, wherein when said polymer is introduced to one of the stages (a) or (b), alkene reactants is also introduced to said other of said stages.

10. Process according to claim 1, wherein said α-alkene is ethylene and the temperature used in stage (a) is higher than the temperature in stage (b).

* * * * *